US011391311B2

(12) United States Patent
Sasaki (10) Patent No.: US 11,391,311 B2
(45) Date of Patent: Jul. 19, 2022

(54) METHOD FOR MANUFACTURING JOINED BODY AND QUALITY MANAGEMENT METHOD FOR PLATE-SHAPED MEMBER

(71) Applicant: Ahresty Corporation, Toyohashi (JP)

(72) Inventor: Kazuki Sasaki, Toyohashi (JP)

(73) Assignee: Ahresty Corporation, Toyohashi (JP)

( * ) Notice: Subject to any disclaimer, the term of this patent is extended or adjusted under 35 U.S.C. 154(b) by 147 days.

(21) Appl. No.: 16/564,572

(22) Filed: Sep. 9, 2019

(65) Prior Publication Data

US 2020/0116180 A1 Apr. 16, 2020

(30) Foreign Application Priority Data

Oct. 12, 2018 (JP) .............................. JP2018-193847

(51) Int. Cl.
*B21J 5/04* (2006.01)
*F16B 5/04* (2006.01)
(Continued)

(52) U.S. Cl.
CPC .............. *F16B 5/04* (2013.01); *B21J 15/025* (2013.01); *B21J 15/28* (2013.01); *B21J 15/10* (2013.01); *F16B 19/086* (2013.01)

(58) Field of Classification Search
CPC . F16B 5/04; F16B 19/086; B21J 15/28; B21J 15/025; B21J 15/10
See application file for complete search history.

(56) References Cited

U.S. PATENT DOCUMENTS 6,964,094 B2 * 11/2005 Kondo ..................... B21J 15/10
29/798
9,283,612 B2 * 3/2016 Trojer .................. B21D 39/031
(Continued)

FOREIGN PATENT DOCUMENTS

JP 2002-121635 A 4/2002
JP 2003-290886 A 10/2003
JP 2016-080464 A 5/2016

OTHER PUBLICATIONS

Abe et al., "Joining of Aluminum Alloy Sheet and High Tensile Strength Steel Sheet by Self Piercing Rivet (2nd Report: Top Sheet Aluminum Alloy Sheet and Bottom Sheet High Tensile Strength Steel Sheet)", 56th Technology of Plasticity Federation Lecture Papers, The Japan Society for Technology of Plasticity, Nov. 4, 2005, pp. 553-554, with partial English translation; Cited in JP Office Action dated May 17, 2022. (6 pages).

(Continued)

*Primary Examiner* — Ryan J. Walters
(74) *Attorney, Agent, or Firm* — WHDA, LLP (57) ABSTRACT

A method for manufacturing a joined body includes at least one first plate material, one second plate material, and a self-piercing rivet where a cylinder portion projects from a head. The method includes: a test step of plastically deforming the second plate material by a load in a plate thickness direction to measure physical value information of the second plate material; a setting step of setting a joining condition based on the physical value information by the test step; and a joining step of supporting a back surface of the second plate material having a front surface on which the first plate material is stacked with a die and driving the cylinder portion from the front surface side toward a concave portion provided in the die to join the first plate material and the second plate material together based on the joining condition set by the setting step.

6 Claims, 6 Drawing Sheets

(51) Int. Cl.
  *B21J 15/02*   (2006.01)
  *B21J 15/28*   (2006.01)
  *B21J 15/10*   (2006.01)
  *F16B 19/08*   (2006.01)

(56) References Cited

U.S. PATENT DOCUMENTS 9,731,340 B2 * 8/2017 Draht .................... B21J 15/285
9,968,987 B2 * 5/2018 Henke ................... B21C 51/005

OTHER PUBLICATIONS

Office Action dated May 17, 2022, issued in counterpart JP Application No. 2018-193847, with English Translation. (10 pages).

* cited by examiner

METHOD FOR MANUFACTURING JOINED BODY AND QUALITY MANAGEMENT METHOD FOR PLATE-SHAPED MEMBER

TECHNICAL FIELD

The present invention relates to a method for manufacturing a joined body that allows a plate material to be less likely to crack in a joining step and a quality management method for a plate-shaped member.

BACKGROUND ART

There has been known a self-piercing rivet in which a cylinder portion projects from a head as a member that joins at least one first plate material to a front surface of a second plate material (Patent Literature 1). The second plate material on which the first plate material is stacked has a back surface supported by an installation surface of a die. The cylinder portion of the self-piercing rivet is driven into the first plate material and the second plate material using a punch from the front surface side of the second plate material toward a concave portion provided in the installation surface. Thus, the cylinder portion passes through the first plate material, and a radially expanded and deformed distal end of the cylinder portion bites into the second plate material to join the first plate material and the second plate material together. In this joining step, the back surface of the second plate material possibly cracks. Patent Literature 1 describes that a small elongation of the second plate material measured by a tensile test causes the second plate material to be likely to crack.

CITATION LIST

Patent Literature

[Patent Literature 1] JP-A No. 2002-121635

SUMMARY OF INVENTION

Technical Problem

However, even when a condition during joining is set according to the elongation of the second plate material in the tensile test based on the above-described prior art, a problem arises in that a crack in the second plate material cannot be sufficiently prevented.

The present invention has been made to solve the above-described problems, and an object of the present invention is to provide a method for manufacturing a joined body that allows a second plate material to be less likely to crack in a joining step and a quality management method for the second plate material.

Solution to Problem

A method for manufacturing a joined body of the present invention to achieve this object is a method for manufacturing the joined body including at least one first plate material, one second plate material, and a self-piercing rivet where a cylinder portion projects from a head. The method includes: a test step of plastically deforming the second plate material by a load in a plate thickness direction to measure physical value information of the second plate material; a setting step of setting a joining condition based on the physical value information by the test step; and a joining step of supporting a back surface of the second plate material having a front surface on which the first plate material is stacked with a die and driving the cylinder portion from the front surface side toward a concave portion provided in the die to join the first plate material and the second plate material together based on the joining condition set by the setting step.

Advantageous Effects of Invention

With the method for manufacturing the joined body according to a first aspect, the joining step that drives the cylinder portion of the self-piercing rivet into the first plate material and the second plate material plastically deforms the second plate material by the load in the plate thickness direction. The test step also plastically deforms the second plate material by the load in the plate thickness direction to measure the physical value information of the second plate material. Therefore, compared with an elongation of a second plate material by a tensile test (plastic deformation in a direction perpendicular to a plate thickness direction), this test step can measure the physical value information of the second plate material closer to a state of the second plate material in the joining step. Since the setting step sets the joining condition based on this physical value information, the joining condition that allows the back surface of the second plate material to be less likely to crack can be accurately set compared with the case where the joining condition is set based on the elongation of the second plate material by the tensile test. Accordingly, the second plate material can be less likely to crack in the joining step.

With the method for manufacturing the joined body according to a second aspect, in addition to the effects provided by the method for manufacturing the joined body according to the first aspect, the following effects are provided. The test step supports the back surface of the second plate material by a test installation surface of a test die, and the test step pushes a columnar test punch having an outer diameter identical to the cylinder portion into the second plate material from the front surface side of the second plate material toward a circular hole provided in the test installation surface in a plate thickness direction. By thus plastically deforming the second plate material so as to project out into the circular hole, the physical value information of the second plate material is measured. Thus, the test step can plastically deform the second plate material in the state close to the second plate material in the joining step and also can plastically deform the second plate material by a method simpler than the joining step and measure the physical value information of the second plate material. Setting the joining condition based on this physical value information allows simplifying the test step and allows the second plate material to be further less likely to crack in the joining step.

With the method for manufacturing the joined body according to a third aspect, in addition to the effects provided by the method for manufacturing the joined body according to the second aspect, the following effects are provided. The setting step sets a value smaller than a projection amount of the back surface from the test installation surface when the back surface of the second plate material cracks in the test step as a maximum value of a depth of the concave portion of the die used in the joining step. Thus, the joining step using the die with the concave portion having the depth of this maximum value or less allows preventing the second plate material from cracking before the second plate material, which plastically deforms in association with the driving of the self-piercing rivet, reaches a bottom of the concave portion. Consequently, the second plate material can be further less likely to crack in the joining step.

With the method for manufacturing the joined body according to a fourth aspect, in addition to the effects provided by the method for manufacturing the joined body according to the first aspect, the following effects are provided. The test step uses a plurality of the dies where at least the concave portions have different depths, and the test step drives the cylinder portion into the first plate material and the second plate material from the front surface side toward the concave portion and joins the first plate material and the second plate material together to measure a state of the back surface of the second plate material relative to a dimension of the concave portion as the physical value information. Thus, the second plate material is plastically deformed similarly to the actual joining step and the physical value information of the second plate material can be measured. Further, the physical value information relates to the dimension of the concave portion and the state of the back surface; therefore, a condition of the dimension of the concave portion under which the second plate material can be less likely to crack can be accurately set. Consequently, the second plate material can be further less likely to crack in the joining step.

With the method for manufacturing the joined body according to a fifth aspect, in addition to the effects provided by the method for manufacturing the joined body according to the fourth aspect, the following effects are provided. When the back surface of the second plate material does not crack at a specific value or less of the depth of the concave portion in the test step, the setting step sets the specific value as a maximum value of the depth of the concave portion of the die used in the joining step. Consequently, the joining step using the die with this concave portion at the depth of the maximum value or less allows the second plate material to be further less likely to crack.

A quality management method for the second plate material according to a sixth aspect is a quality management, method for the second plate material joined to the first plate material by the joining step based on the joining condition in the method for manufacturing the joined body according to any one of the first aspect to the fifth aspect. Based on the bending property of the second plate material measured by the measuring step, the judging step judges whether the back surface of the second plate material cracks in the joining step based on the joining condition. This allows performing the joining step using the second plate material judged not to crack by the judging step. Consequently, whether the second plate material cracks can be known before the joining step.

DESCRIPTION OF EMBODIMENTS

Figure 1:
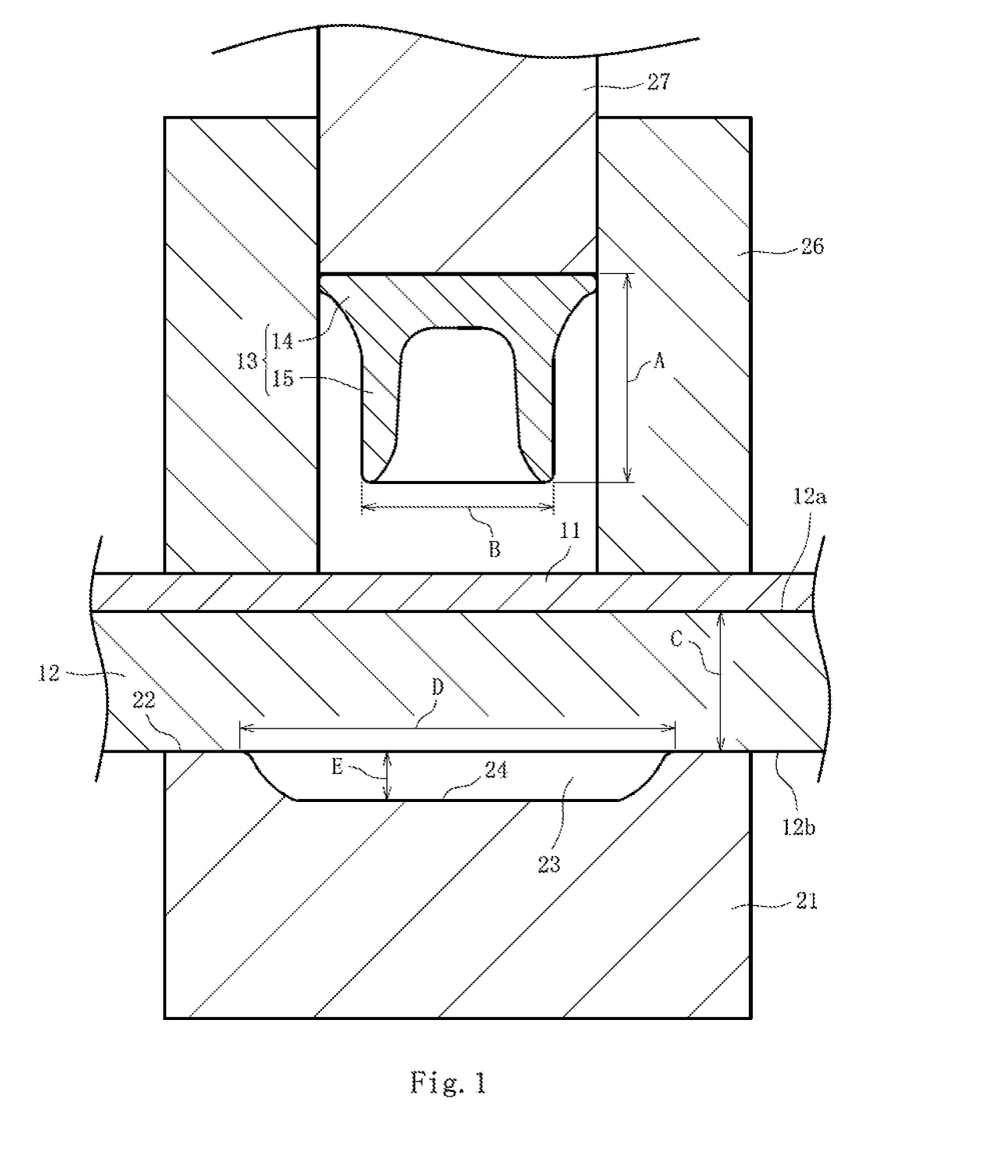
FIG. 1 is an explanatory view illustrating a method for manufacturing a joined body before a joining step according to a first embodiment.
Figure 2:
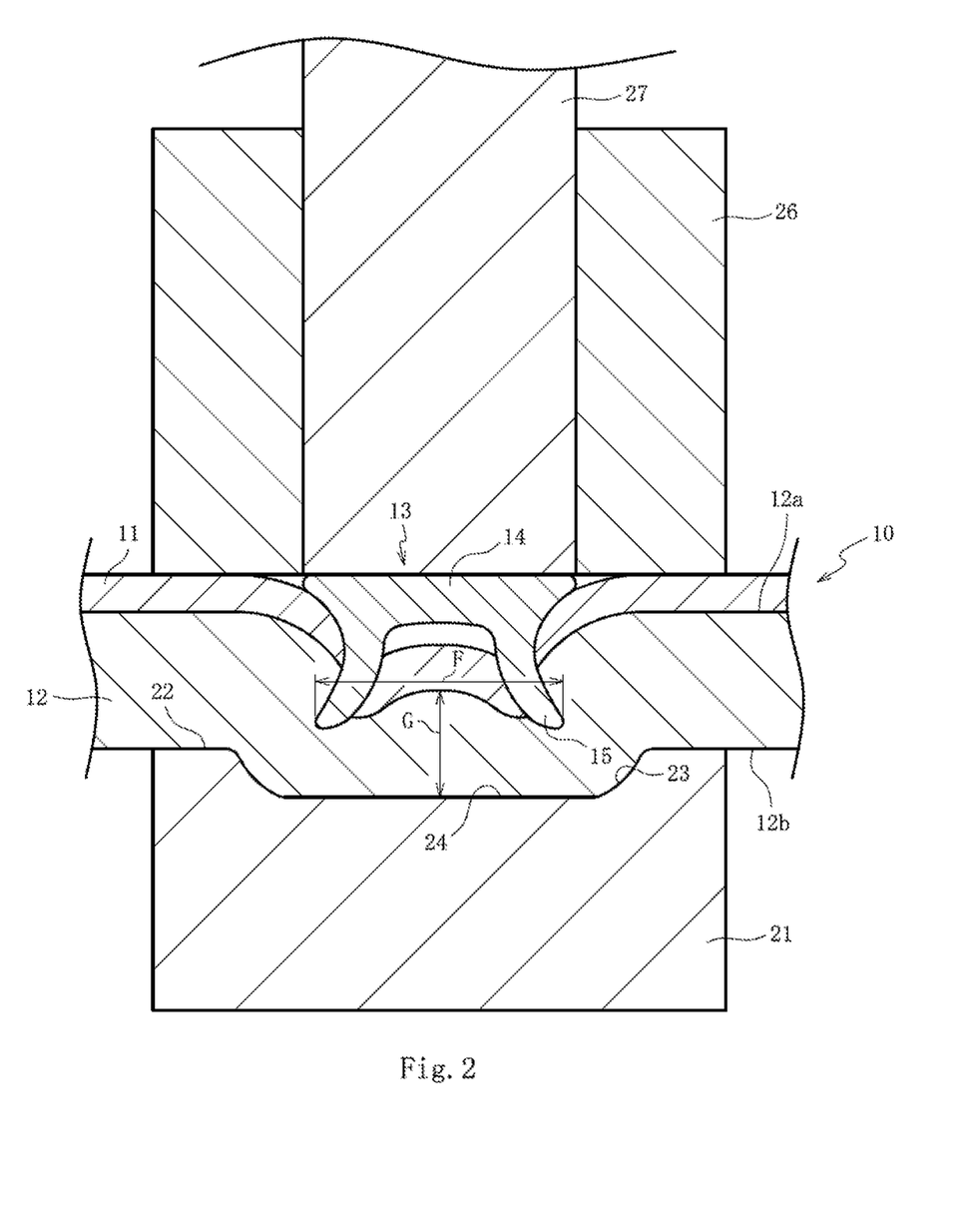
FIG. 2 is an explanatory view illustrating the method for manufacturing the joined body after the joining step.

The following describes preferable embodiments of the present invention with reference to the attached drawings. With reference to FIG. 1 and FIG. 2 first, the following describes a joining step in a method for manufacturing a joined body 10 manufactured by joining a first plate material 11 and a second plate material 12. FIG. 1 is an explanatory view illustrating a state before the joining step. FIG. 2 is an explanatory view illustrating a state after the joining step. FIG. 1 and FIG. 2 illustrate cross-sectional views of respective members in cross section including an axial center of a cylinder portion 15 of a self-piercing rivet 13.

As illustrated in FIG. 1 and FIG. 2, in the joined body 10, the first plate material 11 is joined to a front surface 12a of the second plate material 12 with the self-piercing rivet 13 (hereinafter referred to as "rivet 13") as a self-boring rivet. The first plate material 11 is a steel plate. The second plate material 12 is a plate-shaped member made of aluminum alloy. Note that a part other than the plate-shaped part may be integrally molded with the first plate material 11 and the second plate material 12. That is, the first plate material 11 and the second plate material 12 may be a part of a specific product.

The rivet 13 is made of a metallic material such as steel and aluminum alloy and is appropriate for joining plate materials of different kinds of materials without prepared holes. The rivet 13 includes an approximately circular-plate-shaped head 14 and the cylinder portion 15 as a shaft portion projecting from the head 14. The cylinder portion 15 has an approximately constant outer diameter B and an inner diameter on a distal end side gradually radially expanding toward the distal end. Driving the rivet 13 into the first plate material 11 and the second plate material 12 allows the distal end of the cylinder portion 15 to be easily radially expanded and deformed by this radially expanded inner diameter. A length A of the rivet 13, an outer diameter B of the cylinder portion 15, and the like are configured according to, for example, a plate thickness of the first plate material 11 and a plate thickness C of the second plate material 12 to be joined.

The joining step that joins the first plate material 11 and the second plate material 12 together with the rivet 13 uses a die 21, a cylinder 26, and a punch 27. The die 21 supports a back surface 12b of the second plate material 12. The cylinder 26 presses the first plate material 11 and the second plate material 12 against the die 21. The punch 27 drives the rivet 13 into the first plate material 11 and the second plate material 12. The die 21 is provided with a circular-hole-shaped concave portion 23 with a bottom 24 in an installation surface 22 on which the second plate material 12 is placed. Note that at least a part of an inner diameter of the concave portion 23 is reduced toward the bottom 24. In this concave portion 23, an inner diameter on the installation surface 22 side most is configured as a maximum diameter D. A depth E of the concave portion 23 is an axial distance from the installation surface 22 to the bottom 24.

The cylinder 26 is a cylindrical member positioned concentrically with the concave portion 23. The cylinder 26 is located at the peripheral area of the concave portion 23 to be opposed to the installation surface 22. The punch 27 is a columnar member that axially moves inside the cylinder 26 by a driving device (not illustrated). The punch 27 has an outer diameter configured approximately identical to the outer diameter of the head 14 of the rivet 13.

In the joining step, first, the second plate material 12 having the front surface 12a on which the first plate material 11 is stacked is placed on the installation surface 22 of the die 21 to cover the concave portion 23. Then, the first plate material 11 and the second plate material 12 are sandwiched between an axial end surface of the cylinder 26 and the installation surface 22 of the die 21. Afterwards, the cylinder portion 15 of the rivet 13 is driven into the first plate material 11 and the second plate material 12 from the front surface 12a side of the second plate material 12 toward the concave portion 23 using the punch 27.

Thus, the cylinder portion 15 passes through the first plate material 11 without a prepared hole, and the second plate material 12 pressed by the rivet 13 and the first plate material 11 plastically deforms (deformation by drawing) toward the bottom 24. After a part of the second plate material 12 reaches the bottom 24, while the second plate material 12 plastically deforms along the concave portion 23, the distal end of the cylinder portion 15 bites into the second plate material 12 while radially expanding and deforming. Consequently, the first plate material 11 without the prepared hole and the second plate material 12 are joined with the rivet 13.

The back surface 12b of the second plate material 12 possibly cracks after the joining step according to the length A of the rivet 13, the outer diameter B of the cylinder portion 15, the maximum diameter D of the concave portion 23, the depth E of the concave portion 23, and the like relative to the material and the plate thickness C of the second plate material 12. To secure the joining strength by the rivet 13, these joining conditions need to be preset so as not to crack the back surface 12b in the joining step.

The back surface 12b possibly cracks by tensile stress generated in the back surface 12b of the second plate material 12 applied before the second plate material 12 pressed by the rivet 13 to plastically deform reaches the bottom 24 of the concave portion 23. The larger the depth E of the concave portion 23 is, the larger a deformation amount of the second plate material 12 before reaching the bottom 24. Accordingly, it is considered that the back surface 12b is likely to crack as the depth E becomes large.

Furthermore, it is considered that the tensile stress is generated in the back surface 12b also in the case where the second plate material 12 reaches the bottom 24 and then the distal end of the rivet 13 biting into the second plate material 12 plastically deforms the second plate material 12 along the concave portion 23, and this cracks the back surface 12b. The larger the depth E of the concave portion 23 is, the larger a space between the second plate material 12 and the inner peripheral surface of the concave portion 23 when a part of the second plate material 12 reaches the bottom 24 and the larger the plastic deformation of the second plate material 12 along the concave portion 23. Accordingly, it is considered that the larger the depth E is, the more the back surface 12b is likely to crack. Thus, it is considered that whether the back surface 12b cracks is determined especially according to the depth E of the concave portion 23 among the joining conditions.

The method for manufacturing the joined body 10 includes a test step and a setting step as steps prior to the joining step. The test step plastically deforms the second plate material 12 by a load in a plate thickness direction and measures physical value information of the second plate material 12. The setting step sets the joining conditions based on the physical value information by the test step so as not to crack the back surface 12b of the second plate material 12 in the joining step. The following describes the test step and the setting step of this embodiment in more detail.

The test step fixes the length A of the rivet 13 and the outer diameter B of the cylinder portion 15 but changes the maximum diameter D and the depth E of the concave portion 23 to measure the physical value information of the second plate material 12 caused by the material and the plate thickness C. The setting step sets the maximum diameter D and the depth E at which the back surface 12b does not crack relative to the fixed length A and outer diameter B, and the material and the plate thickness C of the second plate material 12.

Specifically, the test step uses a plurality of the dies 21 having the different maximum diameters D and depths E of the concave portions 23, the first plate material 11 and the second plate material 12 are sandwiched between the installation surface 22 of the die 21 and the cylinder 26, and the cylinder portion 15 of the rivet 13 is driven into the first plate material 11 and the second plate material 12 toward the concave portion 23 using the punch 27. That is, the test step uses the plurality of dies 21 with the concave portions 23 having the different dimensions and joins the first plate materials 11 to the front surfaces 12a of the second plate materials 12 with the rivets 13 similarly to the joining step. The state of the back surface 12b relative to the dimensions of the concave portion 23 is measured as the physical value information of the second plate material 12. In more detail, the presence/absence of crack in the back surface 12b relative to the maximum diameter D and the depth E is measured as the physical value information of the second plate material 12.

The presence/absence of crack in the back surface 12b is judged by a penetrant test. The penetrant test applies penetrant over the back surface 12b to cause the penetrant to soak into a crack, applies developer over the back surface 12b after the penetrant outside the crack is removed and oozes the penetrant. The presence/absence of crack in the back surface 12b may be judged by an eddy-current test and an ultrasonic testing, not limited to the penetrant test.

Thus, similarly to the joining step in which the second plate material 12 plastically deforms by the load in the plate thickness direction, the test step plastically deforms the second plate material 12 by the load in the plate thickness direction and measures the physical value information of the second plate material 12. Since the joining conditions are set in the setting step based on the physical value information of the second plate material 12 in the state further close to the second plate material 12 in the joining step, the joining conditions under which the back surface 12b of the second plate material 12 can be less likely to crack can be accurately set compared with the case where joining conditions are set based on an elongation of the second plate material 12 by tensile test. Accordingly, the second plate material 12 can be less likely to crack in the joining step.

Especially, the test step in this embodiment can plastically deform the second plate material 12 similarly to the actual joining step and measure the physical value information of the second plate material 12 and also can measure the physical value information regarding the dimensions of the concave portion 23 and the state of the back surface 12b. Therefore, the conditions of the dimensions of the concave portion 23 under which the second plate material 12 can be less likely to crack can be accurately set based on this physical value information. Consequently, the second plate material 12 can be less likely to crack in the joining step.

Specifically, first, the setting step judges whether the back surface 12b does not crack with the depth E of the concave portion 23 of a specific value or less in the test step. In the case where the back surface 12b does not crack with the depth E of the specific value or less as the result of the judgment, the specific value is set as the maximum value of the depth E of the concave portion 23 of the die 21 used in the joining step. The joining step using the die 21 with this concave portion 23 at the depth E of the maximum value or less allows the second plate material 12 to be further less likely to crack.

Although the reason will be described later, the value of the maximum diameter D may be freely set in the setting step. However, in the setting step, the value of the maximum diameter D used in the joining step is preferably set in a range of the maximum diameter D used for the test step. This allows the accurate conditions of the dimensions of the concave portion 23 under which the second plate material 12 can be less likely to crack; therefore, the second plate material 12 can be further less likely to crack.

Furthermore, the test step may measure lengths of the respective cracks in the back surface 12b and sum the lengths to calculate the total crack length. In addition, the joined body 10 may be cut off along a cross section including the axial center of the cylinder portion 15 and an enlarged diameter F as an outer diameter at the distal end of the cylinder portion 15 and a center plate thickness G as a plate thickness of the second plate material 12 on the axial center of the cylinder portion 15 may be measured from the cross section as the physical value information of the second plate material 12.

The setting step may calculate "enlargement ratio H (%)=(enlarged diameter F−outer diameter B)/outer diameter B×100," "compression ratio I (%)=(plate thickness C−center plate thickness G)/plate thickness C×100," and "deformation index α=compression ratio I/enlargement ratio H." In the case where the total crack length becomes 0 (no crack) at a specific deformation index α or less, the specific deformation index α is set as a critical value. It can be said that when the deformation index α has a strong positive correlation with the depth E (coefficient of correlation is 0.7 or more), the second plate material 12 does not crack at the specific value or less of the depth E corresponding to the critical value. Accordingly, by setting the specific value of the depth E when the deformation index α has the strong positive correlation with the depth E as the maximum value of the depth E of the concave portion 23 of the die 21 used in the joining step, the second plate material 12 can be further less likely to crack.

Figure 3:
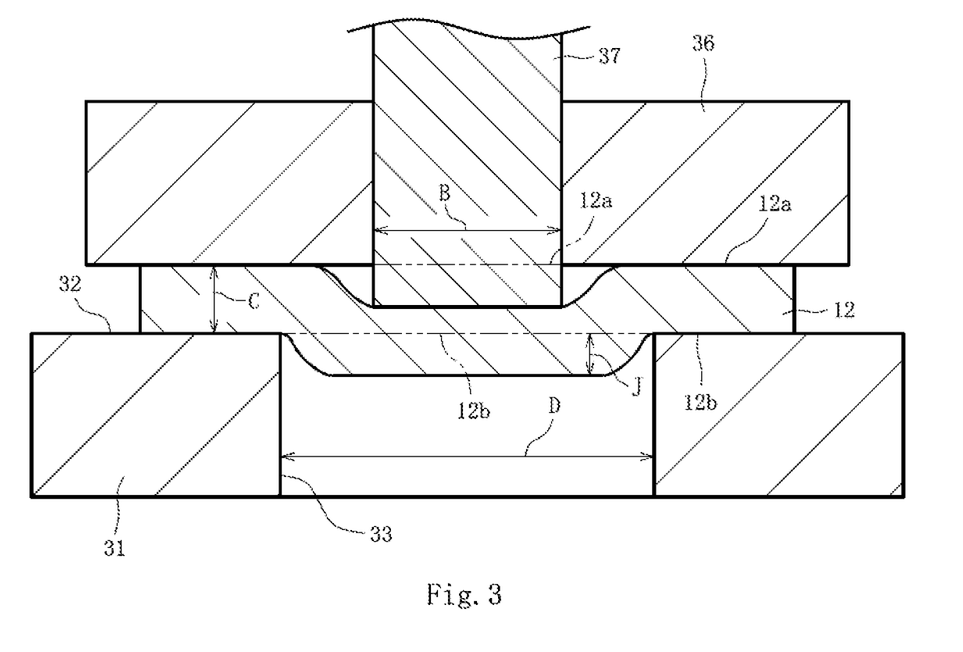
FIG. 3 is an explanatory view illustrating a test step according to a second embodiment.

Next, the following describes a second embodiment with reference to FIG. 3. The first embodiment has described the test step that measures the physical value information of the second plate material 12 using the plurality of dies 21 with the concave portions 23 having the different dimensions. In contrast to this, the second embodiment describes a test step that measures the physical value information of the second plate material 12 using a test die 31 having a circular hole 33 vertically passing through and the like. Like reference numerals designate parts identical to the parts described in the first embodiment, and therefore such parts will not be further elaborated here. FIG. 3 is an explanatory view illustrating the test step in the second embodiment. FIG. 3 illustrates the front surface 12a and the back surface 12b of the second plate material 12 before plastic deformation by two-dot chain lines.

As illustrated in FIG. 3, the test step in the second embodiment uses the test die 31, a test cylinder 36, and a test punch 37. The test die 31 supports the back surface 12b of the second plate material 12 by a test installation surface 32. The test cylinder 36 presses the second plate material 12 against the test die 31. The test punch 37 presses the second plate material 12 by the distal end. The test die 31 has the circular hole 33 opening in the test installation surface 32 to vertically pass through. The circular hole 33 has an inner diameter D configured identical to the maximum diameter D of the concave portion 23 (see FIG. 1 and similar drawing) used in the joining step.

The inner peripheral surface of the circular hole 33 preferably has a shape identical to a shape of the inner peripheral surface of the concave portion 23 used in the joining step. In the inner peripheral surface of the circular hole 33, especially a shape of a part on the test installation surface 32 side is preferably configured identical to the shape of the inner peripheral surface of the concave portion 23. When the inner diameter of the circular hole 33 is maximized on the test installation surface 32 side, the maximum diameter is configured identical to the maximum diameter D of the concave portion 23. This allows the plastic deformation of the second plate material 12 in this test step to approximate the plastic deformation of the second plate material 12 in the joining step.

The test cylinder 36 is a cylindrical member positioned concentrically with the circular hole 33. The test cylinder 36 is located at the peripheral area of the circular hole 33 to be opposed to the test installation surface 32. The test punch 37 is a columnar member that axially moves inside the test cylinder 36 by a driving device (not illustrated). The test punch 37 has an outer diameter 8 configured identical to the outer diameter B of the cylinder portion 15 used in the joining step.

In the test step of this embodiment, while the second plate material 12 is sandwiched between the test installation surface 32 of the test die 31 and the axial end surface of the test cylinder 36, the test punch 37 is pushed into the plate thickness direction from the front surface 12a side of the second plate material 12 toward the circular hole 33. Thus, the second plate material 12 is plastically deformed so as to project out into the circular hole 33 and the physical value information of the second plate material 12 is measured.

While the test step of the first embodiment joins the first plate materials 11 and the second plate materials 12 together with the rivets 13 using the plurality of dies 21, the test step of the second embodiment plastically deforms (deformation by drawing) the second plate material 12 in a state close to the second plate material 12 in the joining step using the one test die 31. The physical value information of the second plate material 12 plastically deformed in the state close to that in the joining step can be measured and the joining conditions can be set based on the physical value information. Accordingly, the second embodiment allows simplifying the test step and allows the second plate material 12 to be less likely to crack in the joining step.

In more detail, the test step monitors, for example, a change in behavior of the back surface 12b of the second plate material 12 from below the circular hole 33 or changes in vibrations of the second plate material 12, the test die 31, and the test punch 37 to sense the crack in the back surface 12b. The test step measures a projection amount J of the back surface 12b from the test installation surface 32 when the back surface 12b cracks.

The setting step sets a value smaller than the projection amount J when the back surface 12b cracks in the test step as the maximum value of the depth E of the concave portion 23 of the die 21 used in the joining step. The joining step using the die 21 with the concave portion 23 having a depth of this maximum value or less allows preventing the second plate material 12 from cracking before the second plate material 12, which plastically deforms in association with the driving of the rivet 13, reaches the bottom 24 of the concave portion 23. Consequently, the second plate material 12 can be further less likely to crack in the joining step.

Furthermore, the inner diameter D of the circular hole 33 is set as the maximum diameter D of the concave portion 23 of the die 21 used in the joining step. This allows setting the joining conditions based on the physical value information of the second plate material 12 plastically deformed in the state close to that in the joining step, thereby allowing the second plate material 12 to be further less likely to crack.

Figure 4:
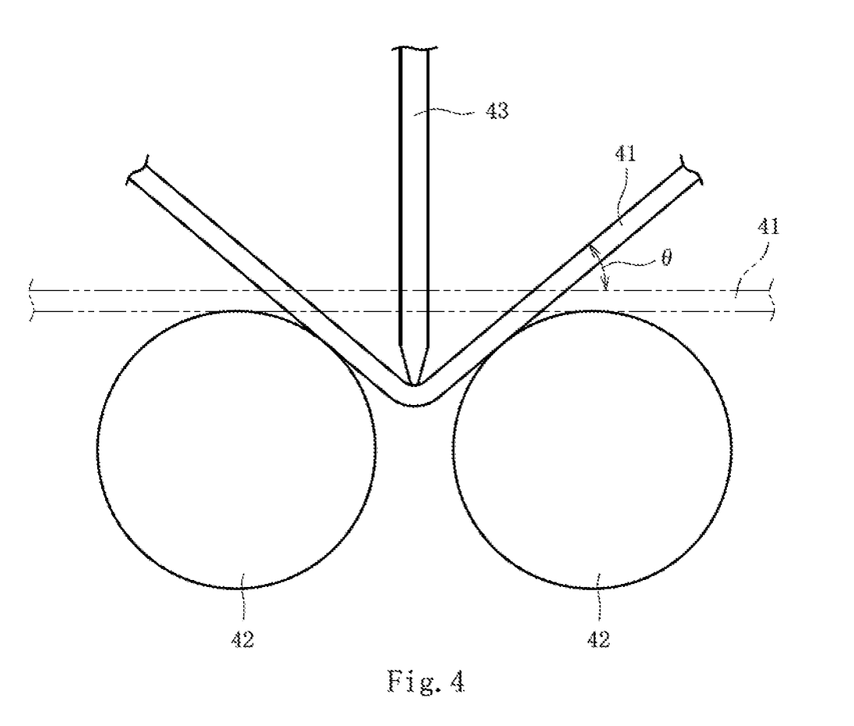
FIG. 4 is an explanatory view illustrating a third plate material test according to a third embodiment.

The following describes a third embodiment with reference to FIG. 4. The first embodiment has described the test step, which measures the physical value information of the second plate materials 12 using the plurality of dies 21 with the concave portions 23 having the different, dimensions, and the setting step, which sets the joining conditions based on the physical value information. In contrast to this, the third embodiment describes a case where the joining conditions are set based on, for example, a bending property of the second plate material 12 and a bending property of a third plate material 41, which is different from the second plate material 12. The following omits descriptions on parts identical to the first embodiment. FIG. 4 is an explanatory view illustrating a third plate material test in the third embodiment. FIG. 4 illustrates the third plate material 41 before plastic deformation by two-dot chain lines.

A method for manufacturing the joined body 10 (see FIG. 1 and FIG. 2) in the third embodiment includes the third plate material test, the test step, the setting step, and the joining step. The third plate material test measures the bending property of the third plate material 41 different from the second plate material 12 in material. The test step measures the bending property of the second plate material 12 as the physical value information by the method identical to the third plate material test. The setting step sets the joining conditions under which the second plate material 12 does not crack. The joining step joins the first plate material 11 and the second plate material 12 together with the rivet 13 based on the joining conditions. The difference in material includes a case where components are identical but mechanical properties are different depending on presence/absence of heat treatment, and heat treatment conditions, in addition to a case of different components.

As illustrated in FIG. 4, the third plate material test is a three-point, bending test that bridges the third plate material 41 across two supporting portions 42 and 42, presses an indenter 43 against the third plate material 41 from upward at the center of the two supporting portions 42 and 42, and bends and deforms the third plate material 41. The third plate material test of this embodiment measures the bending property of the third plate material 41 compliant with a bending test VDA-238-100, a standard from German Automotive Industry Association (hereinafter referred to as "VDA bending test").

The VDA bending test measures a bending angle 9 formed by the third plate material 41 when a load from the indenter 43 to the third plate material 41 is maximized and the third plate material 41 before deformation (flat plate shape). During the maximum load in the VDA bending test means timing when the crack occurs in a part where the load is applied from the indenter 43 in the third plate material 41. Accordingly, the VDA bending test can measure whether the third plate material 41 is locally cracked when how much extent of local load is applied to the third plate material 41.

The setting step sets the joining conditions under which the second plate material 12 does not crack based on the measurement result of this third plate material test (VDA bending test), the bending property of the second plate material 12 measured by the method identical to the third plate material test (the measurement result of the test step), and the joining conditions under which the third plate material 41 does not crack in the joining step using the third plate material 41 instead of the second plate material 12.

For example, as long the bending property of the second plate material 12 is better (the bending angle θ is larger) than that of the third plate material 41, the second plate material 12 is less likely to crack by the local load applied to the third plate material 41. Therefore, setting the joining conditions under which the third plate material 41 does not crack other than the part having the bending property (such as the dimensions of the concave portion 23 and the rivet 13) as the joining conditions for use of the second plate material 12 allows the second plate material 12 to be less likely to crack.

As described above, as long as the joining conditions under which the third plate material 41 does not crack are known and the bending property of the third plate material 41 is preliminarily measured by the third plate material test, only newly performing the simple test step on the second plate material 12 allows accurately setting the joining conditions using the second plate material 12. This allows simply setting the accurate joining conditions.

As the joining conditions under which the third plate material 41 does not crack, known conditions determined after trial and error may be used. The joining conditions under which the third plate material 41 does not crack may be set using the test step and the setting step in the first embodiment and the test step and the setting step in the second embodiment.

Through the multiple measurements of the bending angle θ (bending property) of the identical plate material, it is preferred that the minimum value of a value range of the bending angle θ of the second plate material 12 (the worst result of the bending property of the second plate material 12) is larger than the minimum value of a value range of the bending angle θ of the third plate material 41 (the worst result of the bending property of the third plate material 41). The smaller bending angle suggests that the plate material is likely to locally crack. Accordingly, even when the joining step is performed multiple times using the second plate materials 12 under the joining conditions under which the third plate material 41 does not crack, the second plate materials 12 can be less likely to crack.

Furthermore, as described above, when the joining step is performed using the second plate material 12 under conditions other than the bending property such as the dimensions of the concave portion 23 and the rivet 13 and specific joining conditions under which the third plate material 41 does not crack, as long as the bending property of the second plate material 12 is better than the bending property of the third plate material 41, the second plate material 12 can be less likely to crack. Therefore, as long as the bending property of the second plate material 12 before the joining step, such as during a mass production of the joined body 10, is managed so as to be better than the bending property of the third plate material 41, that is, managed so as to be included in the specific range of the bending property, the second plate material 12 can be less likely to crack in the joining step.

A quality management method for the second plate material 12 (plate-shaped member) joined to the first plate material 11 by the joining step based on the specific joining conditions first measures the bending property of the second plate material 12 (measuring step). Next, whether the back surface 12b of the second plate material 12 cracks in the joining step based on the specific joining conditions is judged based on the bending property measured in the measuring step (judging step).

Specifically, for example, after molding the second plate material 12 to be joined to the first plate material 11, the measuring step measures the bending property of the second plate material 12. Note that a part of the molded second plate material 12 may be cut out and the bending property of the cut out second plate material 12 may be measured. Several pieces of samples may be extracted from the plurality of second plate materials 12 as mass-produced products and the bending properties of the second plate materials 12 as the samples may be measured. Then, the judging step judges whether the bending properties of the second plate materials 12 measured by the measuring step are included in the range of the bending property where the second plate material 12 does not crack in the joining step based on the specific joining conditions.

In a case where the bending property of the second plate material 12 measured by the measuring step is not included in the range of the bending property where a crack does not occur under the specific joining conditions, that is, in a case where the judging step judges that the second plate material 12 cracks, the second plate material 12 is judged as a defective product. On the other hand, when the judging step judges that the second plate material 12 does not crack, the second plate material 12 is judged as a quality item. Thus, whether the second plate material 12 cracks can be known before the joining step. Additionally, since the joining step can be performed using the second plate material 12 judged as the quality item, the second plate material can be further less likely to crack in the joining step.

When the second plate material 12 is judged as a defective product, the component, the heat treatment condition, and the like of the second plate material 12 are changed and the material of the second plate material 12 is changed, and then the measuring step and the judging step are performed again. The steps are repeated until the second plate material 12 is judged as a quality item.

Working Example

While the following describes the test step and the setting step of the present invention in more detail in Working Examples 1 to 3, the present invention is not limited to these working examples. Working Example 1 used a SPFC440 with a plate thickness of 1.2 mm for the first plate material 11 and used an AlSiMgMn-based aluminum die-cast with the plate thickness C of 3.5 mm for the second plate material 12. The length A of the rivet 13 was designed to be 5 mm, and the outer diameter B of the cylinder portion 15 was designed to be 5.3 mm. Further, Working Example 1 used the second plate material 12 on which a heat treatment was not performed. Working Example 2 employed the conditions identical to those of Working Example 1 except that the heat treatment was performed on the second plate material 12 of Working Example 1 at 350° C. for two hours. Working Example 3 employed the conditions identical to those of Working Example 1 except that the heat treatment was performed on the second plate material 12 of Working Example 1 at 380° C. for two hours.

In Working Examples 1 to 3, the joining step was performed using the dies 21 eight types in total where combinations of the maximum diameters D and the depths E of the concave portions 23 of the dies 21 were changed. The test step that measured the presence/absence of crack (total crack length) of the back surface 12b of the second plate material 12, the enlarged diameter F, and the center plate thickness G according to the combination of the maximum diameter D and the depth E was performed. The combinations of the eight types of the maximum diameter D and the depth E are "D=10 mm, E=1.0 mm," "D=10 mm, E=1.5 mm,", "D=11 mm, E=1.0 mm," "D=11 mm, E=1.4 mm," "D=12 mm, E=1.2 mm," "D=12 mm, E=1.5 mm," "D=13 mm, E=1.0 mm," and "D=13 mm, E=1.3 mm."

Figure 5:
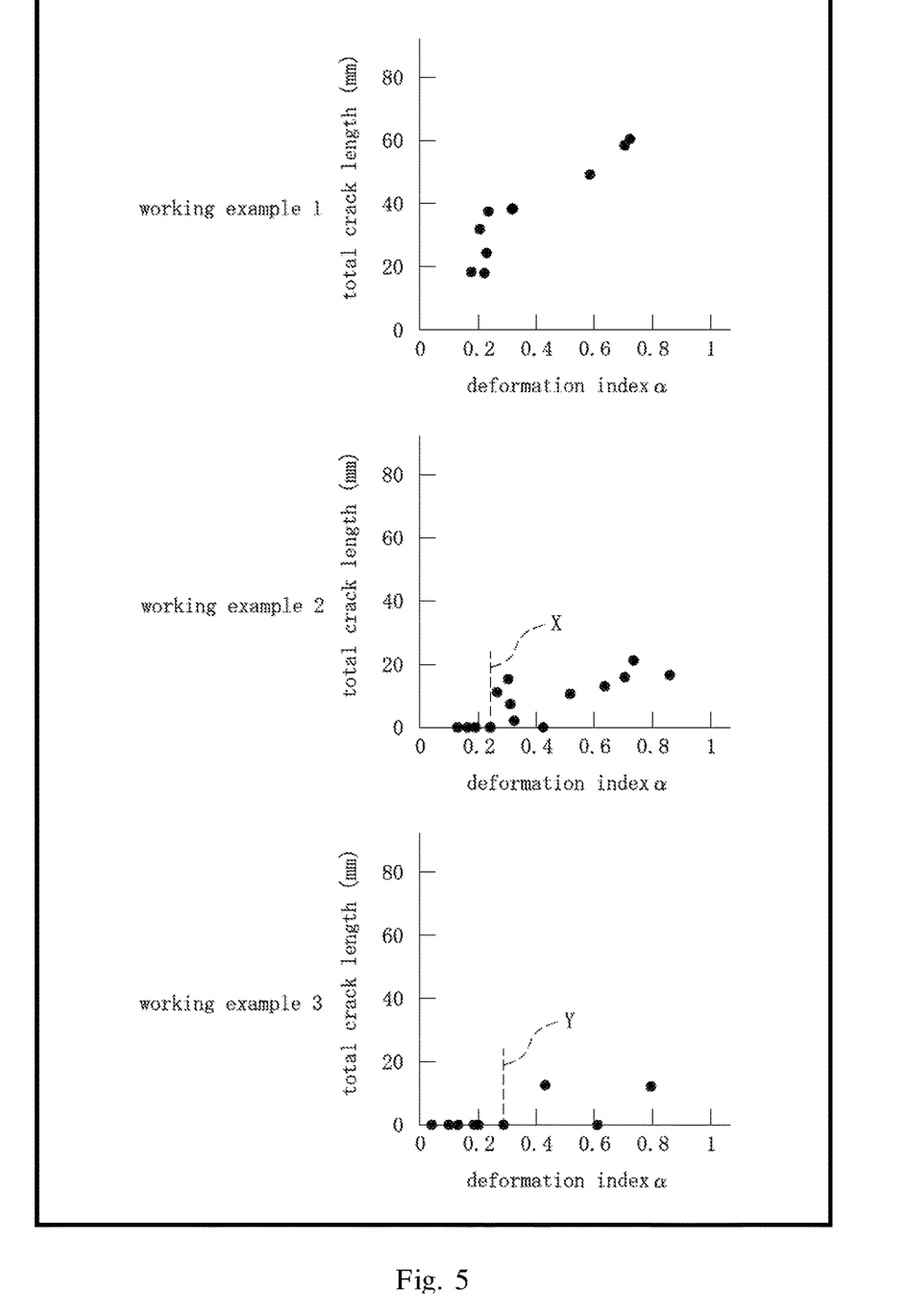
FIG. 5 includes correlation diagrams between a deformation index and a total crack length of each material.

The deformation index $\alpha$ was calculated from the outer diameter B, the plate thickness C, the enlarged diameter F, and the center plate thickness G. FIG. 5 illustrates correlation diagrams between the deformation indexes a and the total crack lengths of Working Examples 1 to 3. As illustrated in FIG. 5, Working Example 1 did not produce the total crack length of 0 (the second plate material 12 always cracked). It has been found that Working Example 2 resulted in the total crack length of 0 at the deformation index $\alpha$ of 0.23 or less (the crack was not generated in the second plate material 12). The value of this deformation index or is defined as a critical value X. It has been found that Working Example 3 resulted in the total crack length of 0 at the deformation index $\alpha$ of 0.29 or less. The value of this deformation index $\alpha$ is similarly defined as a critical value Y.

Figure 6:
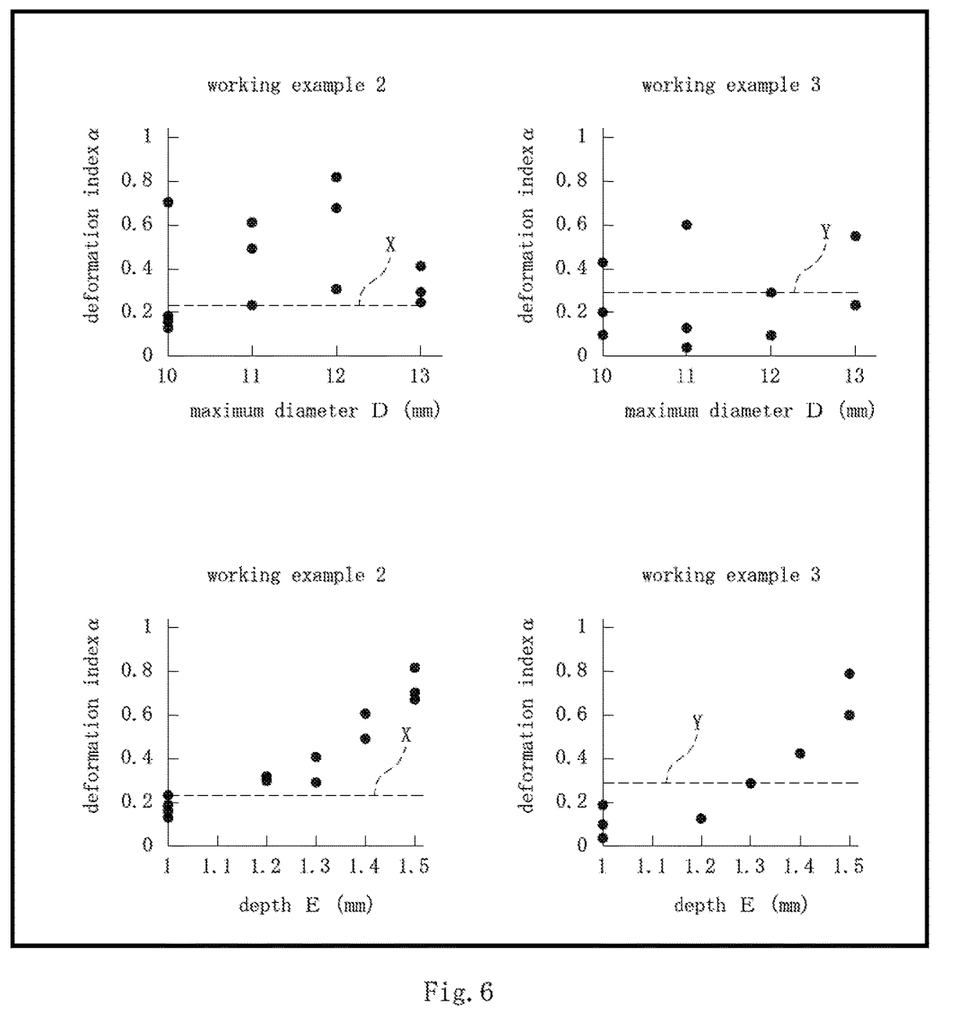
FIG. 6 includes correlation diagrams between the deformation index and a maximum diameter or a depth of a concave portion of each material.

FIG. 6 illustrates correlation diagrams between the deformation indexes a and the maximum diameters D or the depths E of Working Examples 2 and 3 in which the critical values X and Y were obtained. In both of Working Examples 2 and 3, the deformation index $\alpha$ and the depth E had a strong positive correlation (a coefficient of correlation between the deformation index $\alpha$ and the depth E was approximately 0.9). From this result, it can be said that in Working Example 2, the second plate material 12 can be less likely to crack at a specific value (1.0 mm) or less of the depth E with the critical value X. It can be said that in Working Example 3, the second plate material 12 can be less likely to crack at a specific value (1.3 mm) or less of the depth E with the critical value Y.

On the other hand, in both Working Examples 2 and 3, the deformation index $\alpha$ and the maximum diameter D had no correlation. That is, it can be said that even when the maximum diameter D is freely set, identifying the depth E allows the second plate material 12 to be less likely to crack. However, it can be estimated that the deformation index $\alpha$ is correlated with the maximum diameter D only in the range from 10 to 13 mm used in this test step. Therefore, setting the value of the maximum diameter D used in the joining step within the range of this maximum diameter D, from 10 to 13 mm, allows further accurate conditions of the dimensions of the concave portion 23 under which the second plate material 12 can be less likely to crack.

It can be seen from FIG. 5 and FIG. 6 that the smaller the depth E is, the total crack length tends to decrease. Therefore, it can be said that the maximum value of the depth E of the concave portion 23 of the die 21 used in the joining step can be set without confirming the strong positive correlation between the deformation index $\alpha$ and the depth E. Specifically, it can be said that when the back surface 12b does not crack at the specific value or less of the depth E, setting the specific value as the maximum value of the depth E of the concave portion 23 of the die 21 used in the joining step allows the second plate material 12 to be less likely to crack.

The elongations of the second plate materials 12 of Working Examples 1 to 3 were measured multiple times by a tensile test (JIS Z 2241: 2011). A range of the elongation of the second plate material 12 in Working Example 1 was 4.8 to 8.7%. A range of the elongation of the second plate material 12 in Working Example 2 was 9.5 to 12.0%. A range of the elongation of the second plate material 12 in Working Example 3 was 10.0 to 12.3%. Thus, in Working Example 2 and Working Example 3, although the conditions of the depths E under which the second plate materials 12 were able to be less likely to crack were different, the ranges of elongation overlapped. That is, it can be said that even when the joining conditions are set based on the elongation of the second plate material 12 by the tensile test (plastic deformation in a direction perpendicular to the plate thickness direction), the crack in the second plate material 12 cannot be sufficiently prevented.

Further, the VDA bending test measured the bending angles θ (bending properties) of the second plate materials 12 of Working Examples 1 to 3 multiple times. The bending angle θ of the second plate material 12 in Working Example 1 was in a range from 14.4 to 19.3°. The bending angle θ of the second plate material 12 in Working Example 2 was in a range from 21.1 to 26.6°. The bending angle θ of the second plate material 12 in Working Example 3 was in a range from 29.6 to 32.1°.

It has been found that all ranges of the bending angles θ of Working Examples 1 to 3 different in the conditions of the depths E under which the second plate material 12 can be less likely to crack do not overlap. Accordingly, it can be said that setting the joining conditions based on the measurement result of the VDA bending test that plastically deforms the second plate material 12 in the plate thickness direction allows the second plate material 12 to be sufficiently less likely to crack.

Here, the way of the plastic deformation of the second plate material 12 in the test step in the second embodiment is closer to the way of the plastic deformation of the second plate material 12 in the joining step compared with the way of the plastic deformation of the second plate material 12 by the VDA bending test. Therefore, it can be said that setting the joining conditions based on the physical value information of the second plate material 12 by the test step of the second embodiment allows the second plate material 12 to be sufficiently less likely to crack.

It has been found that the joining step that uses the plate material with the bending angle θ of 19.3° or less as the second plate material 12 and uses the die 21 with the depth E of 1.0 mm or more cannot prevent the second plate material 12 from cracking. On the other hand, it has been found that the joining step that uses the plate material with the bending angle θ of 21.1° or more as the second plate material 12 and uses the die 21 with the depth E of 1.0 mm or less allows preventing the second plate material 12 from cracking. Furthermore, it has been found that the joining step that uses the plate material with the bending angle θ of 29.6° or more as the second plate material 12 and uses the die 21 with the depth E of 1.3 mm or less allows preventing the second plate material 12 from cracking.

In other words, it has been found that, in the joining step based on the joining condition of the use of the die 21 with the depth E of 1.0 mm or less, the second plate material 12 only needs to be managed such that the bending angle θ becomes 21.1° or more. Additionally, it has been found that, in the joining step based on the joining condition of the use of the die 21 with the depth E of 1.3 mm or less, the second plate material 12 only needs to be managed such that the bending angle θ becomes 29.6° or more.

The present invention has been described based on the embodiments and the working examples. It will be easily appreciated that the present invention will not be limited to the embodiments and the working examples described above by any means, but various modifications are possible without departing from the technical scope of the present invention. For example, the shapes and the dimensions of the concave portion 23 of the die 21 and the rivet 13 used in the joining step and the materials and the dimensions of the first plate material 11 and the second plate material 12 can be appropriately set. Note that except that the shape of the concave portion 23 in plan view is formed into the circular hole shape, the circular hole 33 in the test die 31 is formed into a hole having an identical shape with the concave portion 23 in plan view.

The one first plate material 11 is not limited to be joined to the second plate material 12, a plurality of the first plate materials 11 may be stacked to and joined to the one second plate material 12. Respective materials and plate thicknesses of the plurality of first plate materials 11 may be different. The bottom 24 of the concave portion 23 is not limited to be flat, but a conical shape or a truncated cone shape protrusion may be disposed on the center of the bottom 24. Such protrusion significantly changes the center plate thickness G; therefore, when the joining conditions are set based on the deformation index cc using the center plate thickness G, the bottom 24 is preferably flat.

While the first embodiment has described the case where the test step differentiates the maximum diameters D and the depths E of the concave portions 23 and measures the physical value information of the second plate materials 12 and the setting step sets the maximum diameter D and the depth E of the concave portion 23, this should not be construed in a limiting sense. The test step may fix the maximum diameters D and differentiate only the depths E of the concave portions 23 and measure the physical value information of the second plate materials 12, and the setting step may set the depth E of the concave portion 23. Alternatively, the test step may fix the maximum diameters D and the depths E, differentiate at least one of, for example, the materials and the plate thicknesses C of the second plate materials 12, and the materials, the lengths A, and the outer diameters B of the rivets 13, and measure the physical value information of the second plate materials 12, and the setting step may set the differentiated values and the like.

While the case where the setting step of the second embodiment sets the value smaller than the projection amount J when the back surface 12b cracks in the test step as the maximum value of the depth E of the concave portion 23 of the die 21 used in the joining step has been described above, this should not be construed in a limiting sense. The maximum value of the depth E of the concave portion 23 of the die 21 used in the joining step may be estimated from a push-in amount of the test punch 37 when the back surface 12b cracks in the test step. For example, assuming that this push-in amount of the test punch 37 is a value approximately identical to the projection amount J, a value smaller than the push-in amount may be set as the maximum value of the depth E of the concave portion 23 of the die 21 used in the joining step.

The method identical to the test step in the second embodiment may measure the projection amount J or the push-in amount of the test punch 37 when the third plate material 41 cracks as the physical value information of the third plate material 41. Then, the joining conditions under which the second plate material 12 does not crack may be set based on this physical value information of the third plate material 41, the physical value information of the second plate material 12, and the joining conditions under which the third plate material 41 does not crack. This allows easily setting the accurate joining conditions similarly to the third embodiment. Furthermore, since the way of plastic deformation of the second plate material 12 in the test step of the second embodiment is closer to the way of deformation of the second plate material 12 in the joining step compared with the way of the plastic deformation of the second plate material 12 in the test step of the third embodiment, the second plate material 12 can be further less likely to crack.

Similarly to the description in the third embodiment, the range of the specific projection amount J or push-in amount of the test punch 37 in which the second plate material 12 does not crack in the joining step based on the specific joining condition may be identified. Then, the measuring step may measure physical values such as the projection amount J of the second plate material 12 and the push-in amount of the test punch 37, and whether the back surface 12b of the second plate material 12 cracks in the joining step based on the specific joining condition may be judged based on whether the physical values are included in the specific ranges.

While the third embodiment has described the case where the bending properties of the second plate material 12 and the third plate material 41 are measured by the VDA bending test, this should not foe construed in a limiting sense. Insofar as the bending property of the second plate material 12 and the bending property of the third plate material 41 are measured by an identical method, the measuring method can be appropriately changed. The bending properties of the second plate material 12 and the third plate material 41 may be measured by a three-point bending test and a four-point bending test other than the VDA bending test.

Insofar as the test step employs a method that plastically deforms the second plate material 12 by the load in the plate thickness direction and measures the physical value information of the second plate material 12, a method other than the test steps in the respective embodiments may be used. Compared with the conventional manufacturing method that sets the joining conditions based on the elongation of the second plate material 12 by the tensile test, setting the joining conditions based on the physical value information of the second plate material 12 plastically deformed by the load in the plate thickness direction identical to the joining step allows accurately setting the joining conditions under which the second plate material 12 can be less likely to crack.

The invention claimed is:

1. A method for manufacturing a joined body including at least one first plate material, one second plate material, and a self-piercing rivet where a cylinder portion projects from a head, the method comprising:
   a test step of plastically deforming the second plate material by a load in a plate thickness direction, determining whether a back surface of the second plate material has been cracked under the load, and measuring physical value information including one or more variables of a simulated joining condition upon detection of a crack in the back surface, wherein the one or more variables include a displacement of the back surface of the second plate material in the plate thickness direction;
   a setting step of determining a joining condition based on the physical value information measured in the test step; and
   a joining step of supporting the back surface of the second plate material having a front surface on which the first plate material is stacked with a die and driving the cylinder portion from the front surface side toward a concave portion provided in the die to join the first plate material and the second plate material together based on the joining condition determined by the setting step; wherein the first plate material is a steel material and the second plate material is an aluminum material or an aluminum alloy thereof.

2. The method for manufacturing the joined body according to claim 1,
   wherein the test step includes:
   supporting the back surface of the second plate material by a test installation surface of a test die,
   placing a columnar test punch on the second plate material without the self-piercing rivet interposed between the columnar test punch and the second plate material, the columnar test punch having an outer diameter identical to a diameter of the cylinder portion before joining of the first plate material and the second plate material in the joining step,
   pushing the columnar test punch into the second plate material from the front surface side toward a circular hole provided in the test installation surface in the plate thickness direction to project the second plate material into the circular hole, and
   measuring the physical value information.

3. The method for manufacturing the joined body according to claim 2,
   wherein the joining condition at least includes a maximum value of a depth of the concave portion of the die used in the joining step, and
   wherein the setting step determines a value smaller than a projection amount of the back surface from the test installation surface when the back surface of the second plate material cracks in the test step as the maximum value of the depth of the concave portion of the die used in the joining step.

4. The method for manufacturing the joined body according to claim 1,
   wherein the test step uses a plurality of dies where at least the concave portions have different depths, and the test step includes:
   driving the cylinder portion into the first plate material and the second plate material from the front surface side toward the concave portion,
   joining the first plate material and the second plate material together, and
   measuring a state of the back surface relative to a dimension of the concave portion as the physical value information, wherein the dimension of the concave portion represents the displacement of the back surface of the second plate material in the plate thickness direction.

5. The method for manufacturing the joined body according to claim 4,
   wherein the joining condition at least includes a maximum value of the depth of the concave portion of the die used in the joining step, and
   wherein when the back surface of the second plate material does not crack at a specific value or less of the depth of the concave portion in the test step, the setting step determines the specific value as the maximum value of the depth of the concave portion of the die used in the joining step.

6. The method for manufacturing the joined body according to claim 1, further comprising:
 a measuring step of measuring a bending property of the second plate material; and
 a judging step of judging whether the back surface of the second plate material cracks in the joining step based on the bending property measured by the measuring step.

* * * * *